(12) United States Patent
Fraenkel

(10) Patent No.: US 7,331,762 B2
(45) Date of Patent: Feb. 19, 2008

(54) SUBMERGED WATER CURRENT TURBINES INSTALLED ON A DECK

(75) Inventor: Peter L. Fraenkel, London (GB)

(73) Assignee: Marine Current Turbines, Ltd., Bristol (GB)

(*) Notice: Subject to any disclaimer, the term of this patent is extended or adjusted under 35 U.S.C. 154(b) by 0 days.

(21) Appl. No.: 10/549,343

(22) PCT Filed: Mar. 24, 2004

(86) PCT No.: PCT/GB2004/001284

§ 371 (c)(1),
(2), (4) Date: May 8, 2006

(87) PCT Pub. No.: WO2004/085845

PCT Pub. Date: Oct. 7, 2004

(65) Prior Publication Data

US 2006/0232075 A1 Oct. 19, 2006

(30) Foreign Application Priority Data

Mar. 25, 2003 (GB) .................. 3036809.5

(51) Int. Cl.
F03B 17/06 (2006.01)

(52) U.S. Cl. ................. 416/85; 416/244 R (58) Field of Classification Search ........... 415/7; 416/85, 244 R; 290/44, 55

See application file for complete search history.

(56) References Cited

U.S. PATENT DOCUMENTS

| 1,560,309 | A | | 11/1925 | Petersen |
| 2,501,696 | A | * | 3/1950 | Souczek ................. 290/43 |
| 4,383,182 | A | * | 5/1983 | Bowley ................. 290/43 |
| 4,864,152 | A | * | 9/1989 | Pedersen ................. 290/53 |
| 5,440,176 | A | | 8/1995 | Haining |
| 6,091,161 | A | | 7/2000 | Dehlsen et al. |
| 6,652,221 | B1 | | 11/2003 | Praenkel |
| 6,756,695 | B2 | | 6/2004 | Hibbs et al. |

FOREIGN PATENT DOCUMENTS

| WO | WO 99/02853 | 1/1999 |
| WO | WO 00/50768 | 8/2000 |
| WO | WO 03/014561 A1 | 2/2003 |

* cited by examiner

Primary Examiner—Edward K. Look
Assistant Examiner—Nathan Wiehe
(74) Attorney, Agent, or Firm—Brinks Hofer Gilson & Lione (57) ABSTRACT

A support structure for a flowing-water drivable turbine system having a pair of generally horizontal decks of streamlined cross-section and at least one turbine assembly mounted thereon for operational co-operation with a flow of water in which the decks and turbine assembly is submerged.

18 Claims, 10 Drawing Sheets

SUBMERGED WATER CURRENT TURBINES INSTALLED ON A DECK

BACKGROUND OF THE INVENTION

This invention relates to structures for the support of turbines arranged to be immersed in a water current and driven by the kinetic energy of the flow of water.

THE PRIOR ART

In our British Patents GB 2256011 B, and GB 2311566 B, B2348250 and British Patent Application No 0227739.0 we have disclosed constructions pertaining to water driveable turbines; i.e. rotors supported within the water column of the sea, river or an estuary so that the flow of water may turn the rotor to produce either electricity or shaft power for utilisation for a required purpose. It is known from these documents how to use turbines for such purposes and structures of various kinds to support such turbines are also known

OBJECTS OF THE INVENTION

An object of the invention is to provide support structures, referred to herein as "False Sea beds" for the specific purpose of supporting water current turbines (in the sea, a river or an estuary as the case may be).

It is a particular object of the present invention to provide structures capable of supporting one or more water drivable turbine system(s) such have been already described in our earlier British Patents GB 2311566 B and GB 2348250.

However rotors of any known type capable of being driven by flowing water in a manner by which they can drive a generator for the production of electricity or for some other useful application such as a pump or compressor could be applied with this invention whereby a further object of the invention is the provision of support structures suitable for supporting for example rotor(s) that may generally be of the following types:

- axial flow or propeller type (i.e., with rotor(s) which rotate about an axis parallel to the direction of flow)
- cross-flow (or Darrieus type) (with rotor(s) which rotate about an axis approximately normal to the direction of flow)
- reciprocating hydrofoil (which reciprocates through an arc cutting across the flow).

The turbine hydrofoils, of whichever kind, rotate or reciprocate (as the case may be) entirely within the water column of flowing currents, whether they be at sea, in rivers or in estuaries, and which in various ways to be described meet the aforementioned requirements. In other words the active components remain completely submerged throughout their normal mode of operation.

A further important object of this invention is to provide means by which the rotors and other moving parts, such as the power train, can be raised clearly above the surface of the water to permit safe and effective access from a surface vessel for installation, maintenance, repairs and replacement of said components.

TECHNICAL BACKGROUND TO UTILISATION OF THE INVENTION

When a turbine is used in such a way that it is driven by a flow of water the extraction of energy from the water flow causes reduction in the momentum of the passing water which in turn produces large reaction forces on the turbine which reaction forces manifest themselves primarily as a thrust force acting in the direction of the flow and proportional to the numerical square of the mean velocity through the rotor.

This phenomenon is a consequence of the laws of physics, resulting from the transfer of momentum in the flowing water to the moving turbine components, and will occur regardless of the turbine rotor design. In all cases the thrust on the rotor will be in direct proportion to the product of the square of the mean velocity of water flow through the rotor and of the swept area of the rotor. In general, the more powerful and efficient the turbine rotor, the greater the forces that need to be resisted, although under certain conditions, such as should there be a "run away" caused by loss of load, large thrust forces can be produced even when the turbine is not delivering much, or any, usable power to the turbine shaft. This situation is of course a direct consequence of the fact that the forces needed to hold the rotor in position provide reaction to the forces transmitted to the turbine rotor in order to rotate it, which in turn give a measure of its efficacy for the generation of shaft power.

Moreover any such turbine is additionally exposed to numerous cyclic loads caused by phenomena such as the effects of turbulence, passing waves, velocity shear in the water column (i.e. variation in velocity with depth) and vortex shedding, which will impose fluctuating fatigue loadings on any support structure that need to be allowed for in providing adequate structural integrity. Therefore, an essential requirement for any such turbine is for the rotor which extracts the energy to be held in position by a structure with adequate reserves of strength to resist the static and also the dynamic forces imposed on the rotor.

Provision of such a structure is complicated by a number of other general requirements, namely: that the wake generated by the presence of the structure in the water column shall not unduly interfere with the flow through the rotor (or it would reduce the efficiency of the rotor). Hence, for example, the structure needs to be configured such that its wake ideally completely misses the rotor; the structure should also be as economical as possible to manufacture in order to minimise the costs of the system; there needs to be some practical and cost-effective method for installing the structure in a location with strong currents; and there needs to be some practical and cost-effective-method for installing the turbine rotor or rotors onto the structure and then for gaining access to the rotor or rotors in order to maintain and when necessary to replace or repair them.

Various more detailed considerations relate to the provision of a support structure for water current turbines, which are addressed by the present invention are indicated as follows.

Firstly, it should be noted that the flow in the water column at locations with high enough velocities to be suitable for the use of energy capturing turbines varies with depth such that the maximum velocity tends to be near to the surface. Also, the currents low in the water column, near the sea (or estuary or river) bed move much more slowly. Moreover, any uneven natural features in the sea, river or estuary bed will cause disruption of the flow near the seabed and turbulence; the more uneven and rougher the nature of the bed, the greater will be the thickness of a slow moving and turbulent boundary layer.

Secondly, it should be noted that for efficient and reliable extraction of kinetic energy from water currents, using a turbine rotor of the kind proposed, (which may either be an axial flow or a cross-flow rotor, or possibly a reciprocating hydrofoil type of device), it is desirable for the water flow through said rotor or past any moving hydrofoil to be as uniform in velocity across the swept area as possible, to move as fast as possible and to have as little turbulence as possible. In other words it is desirable to have means to position the active rotor(s) or hydrofoil(s) in the fastest and most uniform and turbulence-free flows, avoiding the rotor cutting through any boundary layer caused by flow over an uneven sea, river or estuary bed. It is also essential to support any such rotor(s) or hydrofoil(s) with a structure capable of resisting the most extreme static and dynamic forces that will be experienced with a high degree of reliability over an operational period of many years.

Thirdly, an important further consideration is that any device immersed in the currents in a water column (whether in the sea, a river or an estuary) will need to be accessed occasionally for maintenance, repairs or replacement. Underwater operations in fast flowing currents, whether by human personnel wearing diving equipment or whether by remotely operated underwater vehicles (ROVs), are extremely difficult as most such activities could only be undertaken at times when water flows of less than about 0.5 m/s occur, and in a good energetic location for water current energy exploitation, the duration of periods with such low velocities is at best too short to permit more than the most minor of underwater operations.

As a result a problem to be addressed by this invention is the provision of means for accessing components needing maintenance or repair, in particular the turbine rotor(s) and/or hydrofoils together with the mechanical drive train and generator which they activate, by making it possible to raise said items above the surface of the flowing water current so that access from a surface vessel is possible and no underwater intervention by divers or remotely operated submersible vehicles is needed.

STATEMENTS OF THE INVENTION

Broadly, according to a first aspect of the invention there is provided a support structure for a flowing-water driveable turbine system, wherein a turbine, or a plurality of turbine assemblies, is/are mounted in a column of flowing water for operational co-operation with the flow of water on a deck or platform of streamlined cross-section that is located at an elevated position with respect to the bed of the flowing water, the deck or platform being aligned horizontally in at and above the level of the said axes. These extra surfaces may be added as a parallel surface to the main supporting surface either at the level of the turbine rotor axes or above the level of the turbine rotors, or both of these options.

Furthermore, said extra surfaces may preferably be smaller in chord and in thickness than the lowermost supporting surface, but they may also be equal sized or larger.

Preferably, the first mentioned deck or platform of streamlined cross-section has an asymmetrical streamlined cross section in which there is greater convexity on one surface compared with the other to the extent that upper and lower surfaces are be convex, with one more so than the other.

Conveniently provision is made to allow the rectangular planformed deck or platform of streamlined cross-section to be either released from its supports and rise to the surface using buoyancy in a controlled manner or to have some lift mechanism which may generally be electrically or hydraulically activated, so that there is the facility for the entire rectangular planformed deck or platform of streamlined cross-section complete with the array of turbines to reach the water surface so that the turbines may be accessed for maintenance or repairs using surface vessels.

Preferably, the rectangular planformed deck or platform of streamlined cross-section has an asymmetrical streamlined cross section in which there is greater convexity on one surface compared with the other, to the extent that both surfaces (upper and lower may be convex, one more so than the other) or one surface (upper or lower) is convex and the other is either substantially flat or concave. The effect of this will be to accelerate the flow over the more convex surface in a manner designed to reduce velocity shear through the rotor (velocity shear is the tendency for water in the upper part of a current to move faster than water nearer to the seabed).

such a manner that is aligned horizontally with the current so as to minimise its resistance to the water flow.

In accordance with a second aspect of the invention there is provided a support structure for a flowing-water driveable turbine system, wherein a turbine, or a plurality of turbine assemblies, is/are mounted for operational co-operation with a flow of water on a deck or platform of streamlined cross-section in such a manner that the turbine(s) is/are deployed laterally (i.e. normal to the direction of flow) across the current and wherein the platform is aligned horizontally with the current so as to minimise its resistance to the water flow.

Preferably, the deck or platform is of a rectangular planform.

Preferably, the deck or platform carrying the turbines is either supported in the elevated position by at least two supporting legs or struts upstanding from the bed of said flowing water or is held down in the water column by tensioned cables, ropes or ties anchored to the bed, to be at said elevated location.

Conveniently, wherein means are provided for enabling the deck or platform to be displaced between its operation location and a second location adjacent to the surface of the water whereby the turbine or turbines associated with the deck or platform can at least reach the surface of the water whereby the turbines may be accessed for maintenance or repairs using surface vessels.

In a preferred construction at least one further deck or platform of streamlined cross-section arranged in "biplane" or "triplane" form, the arrangement being such as to improve the structural integrity of the support structure and to provide surfaces parallel to the surface of the first mentioned deck or platform either at the level of the axes of the associated turbine or turbines associated with the first mentioned deck or platform, above the level of the said axes. or a combination of In a further preferred arrangement the formation of said surfaces is such that the accelerated flow over the more convex surface serves to enhance the performance of the turbines in the case where the greater convexity is in the upper surface.

In accordance with a further aspect of the invention an asymmetrical streamlined cross-section is used for the rectangular planformed deck or platform in such a way that if the more convex side is downwards facing it will cause a down thrust as a result of lift forces generated which will help to seat the platform more securely on its supports or where the more convex surface is upwards facing it will create an up thrust as a result of lift forces which can help maintain the tension and stability in a tension leg buoyant fixing arrangement.

Preferably where the rectangular planformed deck or platform has a streamlined cross-section whose upper surface more convex than its lower surface, in order to accelerate the water flow through the TOW of turbines, and the space below the rectangular plan formed deck or platform of streamlined cross-section is substantially blocked by a suitable obstruction to force most of the water flow to rise and accelerate over its upper surface and through the turbine rotors and to enable a small proportion of the flow to be bled through a narrow slot between the lower surface of the rectangular planformed deck or platform of streamlined cross-section and the top of the aforementioned obstruction in order to prevent the turbulent boundary layer being deflected over the top of the rectangular planformed deck or platform of streamlined cross-section, the arrangement being such that a significant increase in the mean flow velocity through the turbine rotors is obtained, thereby improving their power output and with appropriate design it will also reduce velocity shear to give a more uniform and less turbulent flow through the turbine rotors, which will also enhance efficiency of energy capture and tend to reduce fatigue loads on the turbine rotors.

Broadly, according to an additional aspect of the present invention, there is provided a support system in the form of a deck or raft for at least one turbine, and more generally a plurality of turbines (i.e. water driveable rotors capable of delivering useful power) the arrangement of the support system serving to provide a planar smooth surface of a generally rectangular platform, (i.e. when viewed from directly above) with adequate structural integrity as not to flex unduly, deployed like a deck or bridge in the water column such that it forms a floor to support one or more, generally a row of, turbines the arrangement being such that the surface performs like a "false seabed" having a smooth surface to enhance the evenness of flow over it as compared with the water flow over most real sea beds.

This surface can either be supported on weight bearing struts like legs so that it sits on the bed of the sea, river or estuary much like a table standing on a plurality of legs, or it can be buoyant and held in the water column by a plurality of tensioned cables attached to the bed of the sea, river or estuary using suitable ground anchors much like a rectangular tension buoy tethered to float low in the water column.

The planar smooth surface will generally be rectangular in plan view and the longer dimension will be sufficient to accommodate the overall width of however many individual turbines may be attached to its upper surface. Moreover the longer dimension will generally be set normal to the direction of flow of the currents so that the turbines which will be attached to its upper surface are arranged laterally across the current with the operational profile of all the rotors normal to the flow so as to intercept as much of the flow as possible. In effect the structure will resemble a rectangular planform "wing" suspended in the water column with a row of turbines arranged above it.

The cross section or profile of the rectangular surface or deck is to be streamlined for two reasons, namely to minimise the drag it will experience from the passing current and also to assist in orientating the flow in such a way as to minimise turbulence in the flow passing over the top of the surface and through the rotors. In order to provide a streamlined surface the leading and trailing edges of the profile with respect to the flow of water will be tapered either to a sharp edge or to a narrow but rounded edge much like the leading edge of the wing or an aircraft or the hydrovane of a submarine or ship stabiliser. In some situations, where a tidal flow occurs and the direction of the current reverses periodically (with the ebb and flood of the tides), the surface will be symmetrical in cross section such that it exhibits low drag whether the flow is in one direction or in the reverse direction.

It is also possible to shape the planar smooth rectangular surface or deck so as to enhance the velocity of flow passing through the rotor(s) mounted above its upper surface and to improve the uniformity of flow through the rotors. In this way not only will the surface or deck act as a structure to carry the turbine rotor(s) but it will also be designed so as to improve the uniformity and possibly the velocity of the flow through the rotor(s) which will enhance their performance and efficiency compared with operation in unmodified flow.

To achieve this flow enhancement, the cross section of the rectangular planar surface or deck may (in some but not all cases) also be asymmetrical or cambered in cross section (i.e. convex on one side and possibly concave, flat or at least less convex on the other) in such a way that it generates a lift force perpendicular to the current m much the same way as an airfoil or hydrofoil. In the case where the surface is supported by legs or struts, said asymmetry could be arranged so as to generate a vertically downward lift force to improve the engagement of the legs with the sea, river or estuarial bed but in the case where the surface or deck is buoyant and held down by tensioned moorings, then the profile or cross section would be asymmetrical so as to create a vertically upwards acting lift force to increase the tension in the supporting cables as the current increases and thereby to stabilise the structure in the water column and avoid it being displaced unduly by the thrust from the current.

The support structure of the invention therefore resembles a wing-like arrangement with turbines mounted above it such that their rotor(s) or driven hydrofoils are set in a horizontal row normal to the flow of the current. Said wing nay be symmetrical and streamlined and supported on a plurality of legs or struts, or it may be buoyant and held by tensioned cables or members securely anchored to the bed of the sea, river or estuary.

BRIEF DESCRIPTION OF THE DRAWINGS

For a better understanding of the invention and to show how to carry the same in effect reference will now be made to the accompanying drawings in which:

FIG. 2 A is an end view of a second embodiment turbine support structure and associated turbines, the Figure illustrating the support structure in a turbines raised position;

DETAILED DESCRIPTION OF THE DRAWINGS

Figure 1A:
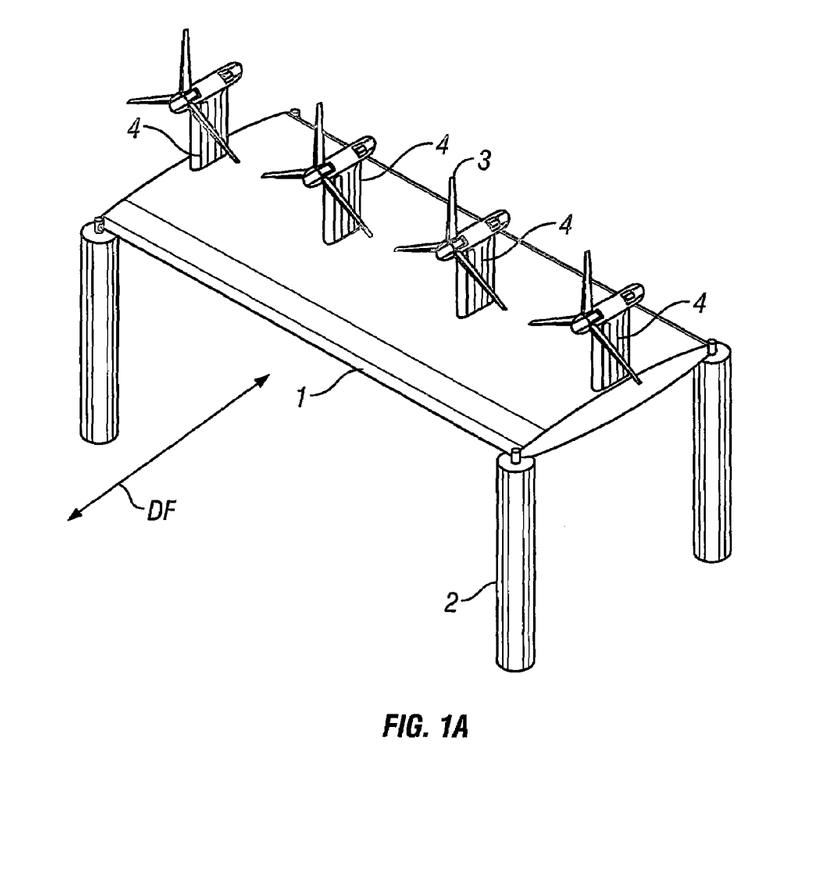
FIG. 1A is an isometric schematic view of a first embodiment support structure for mounting turbines drivable by flowing water with a row of turbines carried thereby.
Figures 1B, 1C:
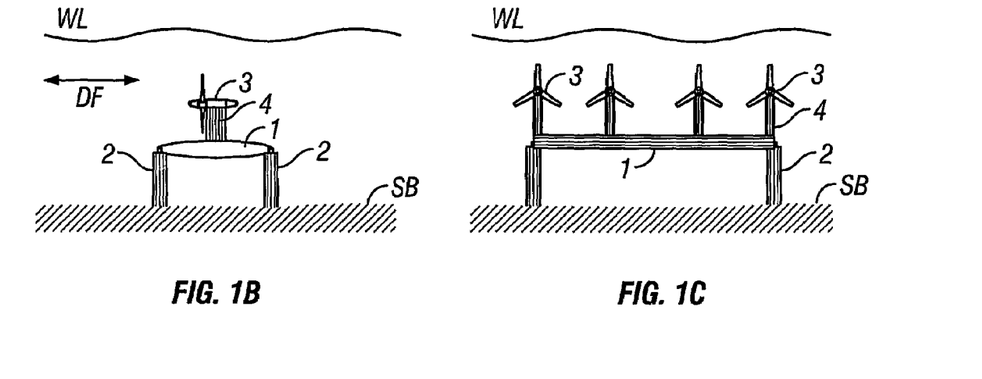
FIG. 1B is and end view of the isometric view of FIG. 1A.
FIG. 1C is a front view of the isometric view of FIG. 1A.

Referring now to FIGS. 1A, 1B and 1C these Figures respectively show in schematic isometric, side and end elevations respectively the major elements of a first embodiment of a support structure incorporating the concepts of the invention, namely a platform or deck 1 fixed in place by, for example, a plurality of legs 2 upstanding from a river, estuary or sea bed SB and carrying a number of water current driven turbines (3) arranged in a row normal to the direction of flow DF of the current. past the turbines. The Figures illustrate the use of four axial flow turbines, 3 but some other number may be used. Furthermore, various types of and different types of turbine may be used as previously mentioned. In the basic embodiment shown in FIG. 1 the turbines 3 are supported on individual cantilevered, streamlined supporting struts 4 above discussed. In the Figures the direction of water flows DF is indicated by the double ended arrow so as to indicate bi-directional water flow possibilities Before actual consideration of the content of the further Figures and the remaining Figures of the specification it is thought convenient to give an overview of the general formation and development of the various support structures illustrated and discussed in relation to the Figures Thus regarding the embodiment of FIGS. 1A, 1B and 1C as a basic structure the development of these basic concepts of the invention represented thereby can involve additional features such as the following.

Providing a second set of planar horizontal members between each turbine, parallel to and above a main supporting surface or deck already described in such a way that the structure resembles a biplane's wing arrangement; the second set of planar members will also be streamlined and will generally (but not necessarily) be of smaller cross-sectional dimensions than the main wing-like supporting deck.

Providing means for making the supporting planar surface or deck buoyant (if it is not permanently buoyant) such as by displacing water out therefrom using compressed air and of providing means for releasing planar surface or deck from the structural members attaching it to the bed of the sea, river or estuary in such a way that it can float to the surface in a controlled manner such that the turbines on top of it emerge above the surface of the sea or river or estuary and may then be easily accessed from a surface vessel for servicing or maintenance.

Providing means for physically raising the supporting planer surface or deck using suitable lifting devices in the event that buoyancy is not used as the primary method for causing it to float to the surface as described in the previous paragraph.

Providing the optional means for completely detaching and subsequently reattaching the planar supporting surface complete with turbines from the members or moorings attaching it to the bed of the sea, river or estuary, in such a way that it can be floated and either raised onto a barge using a crane or towed as a floating vessel to a shore-base for repairs or maintenance. A similar unit could then be substituted and left in place to continue generation of power.

Providing the optional means for wholly or partially blocking the space below the supporting surface so that water is wholly or partly inhibited from flowing beneath it; the effect will be to further accelerate the flow of water over the top of the planar surface and through the turbine rotor(s) thereby enhancing the power gained by the system. A preferred embodiment would involve blocking most of the space between the seabed and the underside of the planar surface, but leaving a relatively vertically narrow passage immediately below the planar surface so as to allow a clean flow immediately below it; in this way any turbulent boundary layer flowing above the sea, river or estuarial bed may be bled under the planar surface through the aforementioned space in order to keep the flow over the top as free of turbulence as possible.

Providing an optional further streamlined planar wing-like member that can be carried above the level of the turbine(s), supported by streamlined vertical, or near vertical struts, and having a similar rectangular planform to the primary support member described before. This arrangement would have a configuration much like a multi-engined biplane aircraft with the power units, turbines in this case, arranged between the "wings". The aforementioned second set of planar members deployed between the turbines may alternatively be replaced by the aforementioned optional streamlined planar wing-like member that can be carried above the level of the turbine(s).

In the case where an optional further streamlined planar wing-like member is installed above the level of the turbine(s), then a further row of turbines may be installed above this second higher wing to provide two rows of turbines.

In short there can be one, two or three streamlined planar surfaces arranged in a horizontal plane across the flow of the current in a "monoplane", "biplane" or "triplane" arrangement. The advantages and purpose of a biplane or triplane arrangement are partly to improve the structural strength and also partly to shape the streamlined wing like members so that the flow through the turbine rotor(s) is both rendered more uniform (i.e. with less velocity shear across the vertical height of the rotors) and in some cases may be accelerated so that the supporting wings also effectively act as flow augmentors which increase the energy flux through the given cross-section of the rotor(s).

From the forgoing it will be appreciated that a main aspect of this invention, is the use of a streamlined planar surface or deck fixed in the water column so as to carry a row of water current powered turbines arranged across the direction of flow, such that the streamlined planar surface acts as a structural support for the water current turbine(s), it can also be made buoyant such that it can float to the surface permitting access to the turbine(s) arranged on its upper surface. The shape of the streamlined planar surface is such that it improves the uniformity of the flow through the turbine rotor(s) and may in some cases increase the local velocity through the rotor(s) so as to improve the energy capture for a given area of rotor.

Figure 2A:
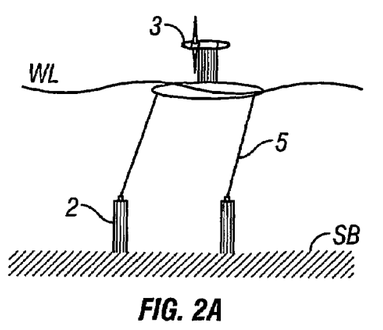
Figure 2B:
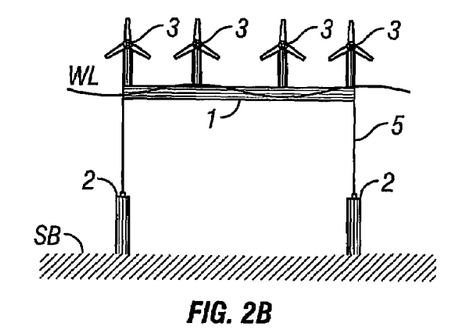
FIG. 2B is a front view of the embodiment of FIG. 2A.
Figure 3A:
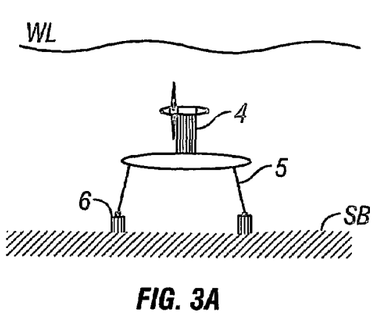
FIG. 3A is an end view of a third embodiment turbine support structure and associated turbines the Figure illustrating the support structure in a turbines operational position.
Figure 3B:
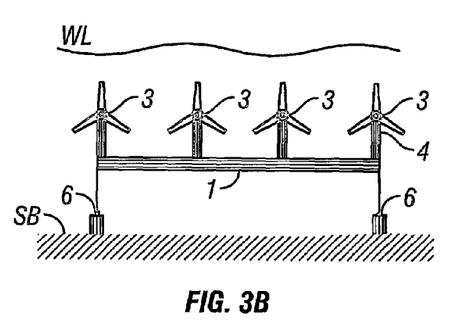
FIG. 3B is a front view of the embodiment of FIG. 3A.
Figure 3C:
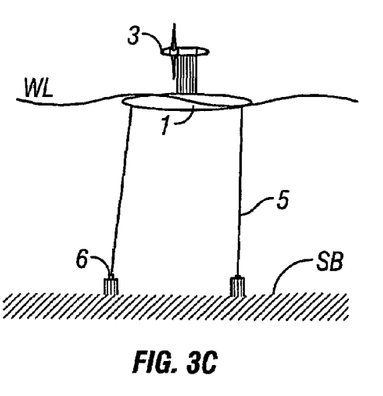
FIG. 3C is an end view of the third embodiment turbine support structure and associated turbines the Figure illustrating the support structure in a turbines raised position.
Figure 3D:
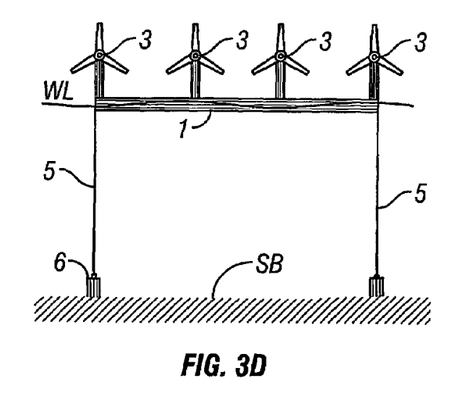
FIG. 3D is a front view of the embodiment of FIG. 3C.
Figure 4A:
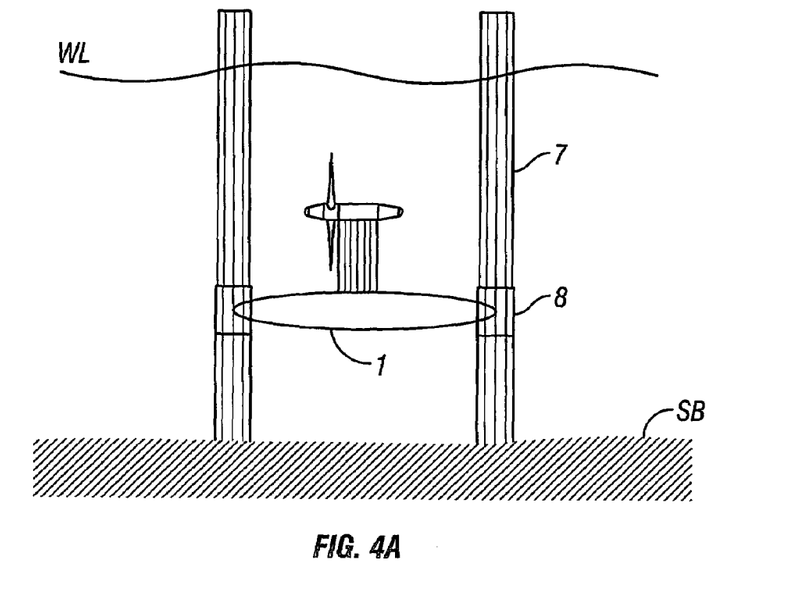
FIG. 4A is an end view of a fourth embodiment turbine support structure and associated turbines the Figure illustrating the support structure in a turbines operational position.
Figure 4B:
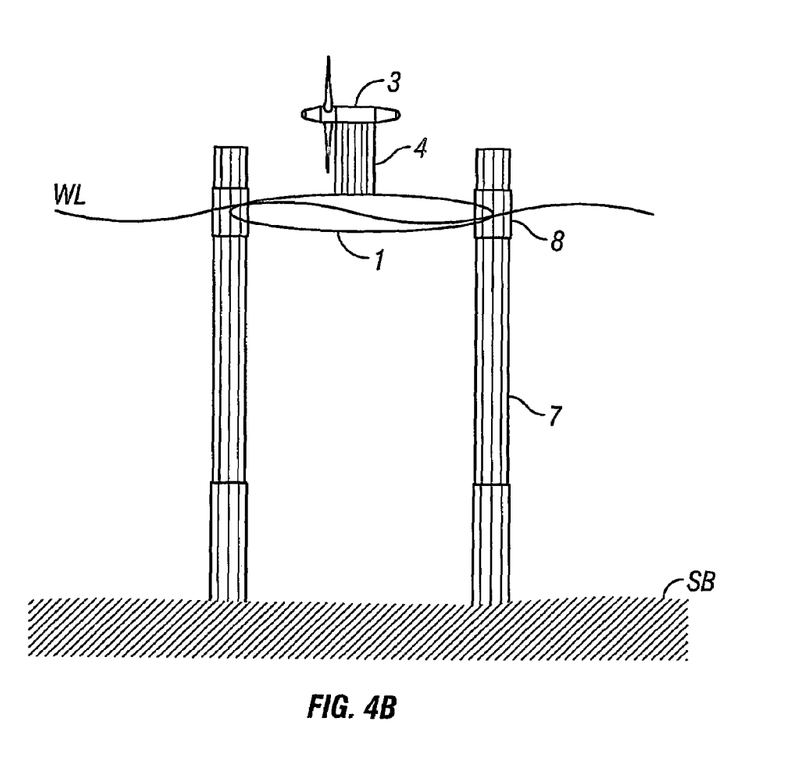
FIG. 4B is an end view of the fourth embodiment turbine support structure and associated turbines the Figure illustrating the support structure in a turbines raised position.
Figure 5A:
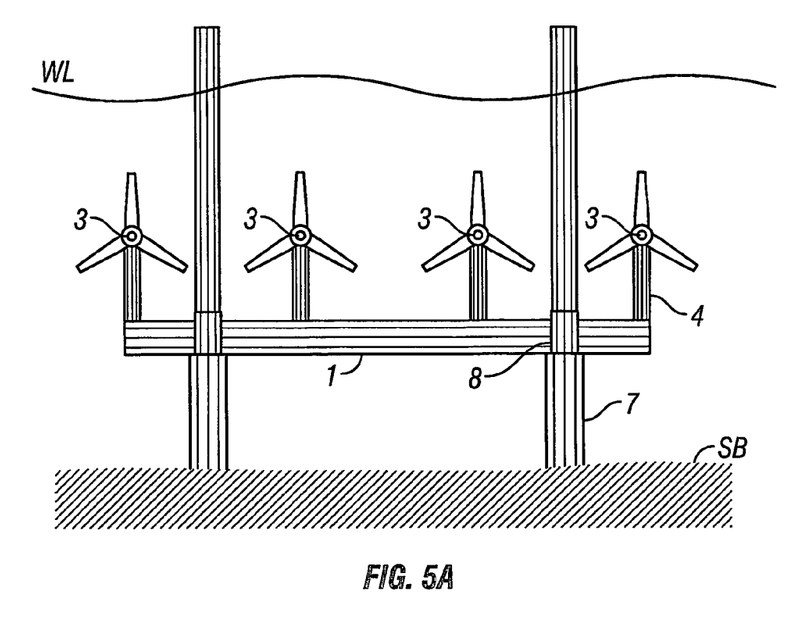
FIGS. 5A and 5B are respectively front views of the embodiment turbine support structure of FIGS. 4A and 4B.
Figure 5B:
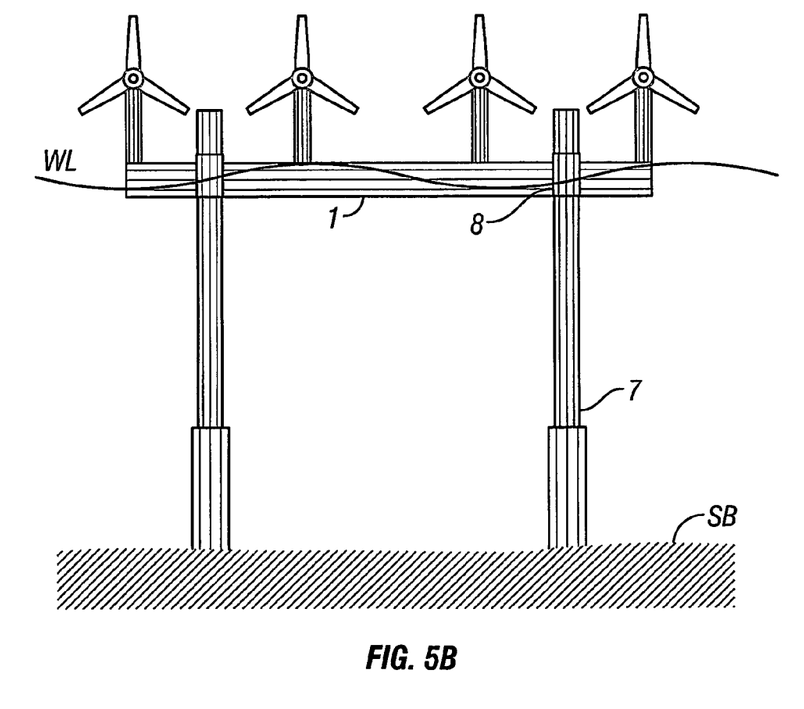

Referring now to FIGS. 2A and 2B illustrate a side/end and front elevation how the platform or deck 1 such as shown in FIG. 1 may be allowed to rise to the surface, by making it buoyant and, for example, by paying out cables, chains or ropes 5 from each corner, these being securely attached to the foundation supports 2. This process can be reversed by drawing the platform or deck 1 down by winding in the cables, chains or ropes 5 until the deck 1 is back in contact with the seabed mounted supports 2. An essential component of this embodiment of the support structure is that the platform or deck 1 carrying the turbines 3 can be in some way allowed to rise (or be lifted mechanically) to the surface to permit access to the turbines for maintenance, repairs or replacement without the need for underwater intervention.

FIGS. 3A, 3B, 3C and 3D show in end/side and front elevation an embodiment of a support structure that can be regarded as a variation of the embodiment of FIGS. 1A 1B and 1C variation where the deck of platform 1 is maintained in a permanently buoyant state and held in place both when submerged and when on the surface by extendible tension moorings 5 attached to suitable fixings 6, embedded or anchored in the sea or river bed, which must be capable of resisting the uplift forces involved.

FIGS. 4A, 4B and FIGS. 5A, 5B show (in side elevation and in front elevation respectively) a further embodiment of a support structure where instead of using extendible flexible chains, cables or ropes, the platform 1 is constrained to two, four (as illustrated) (or some other plurality) of legs 7 which are embedded in the sea or river bed SB and which extend above the surface level WL of the water, in such a manner that the legs guide the vertical movement of the platform or deck carrying the turbine(s) by way of suitable sliding sleeves or other fixings 8 capable of moving vertically with respect to the legs 7 and constrained to follow said legs.

It can be seen that the upper part of the legs 7 (as shown in FIGS. 4A, 4B and 5A, 5B) that guide the vertical movement of the platform or deck carrying the turbines can optionally be narrowed to reduce their drag in the current as shown (so the cross section of the upper part of the leg viewed in plan resembles an ellipse). It should also be noted that the legs are positioned between the rotors of the turbines so that their wakes when the current is flowing do not impinge on the rotors or at least the interference between rotors and wakes is minimised. This is the preferred arrangement as clearly indicated in FIGS. 5A and 5B.

Figure 6A:
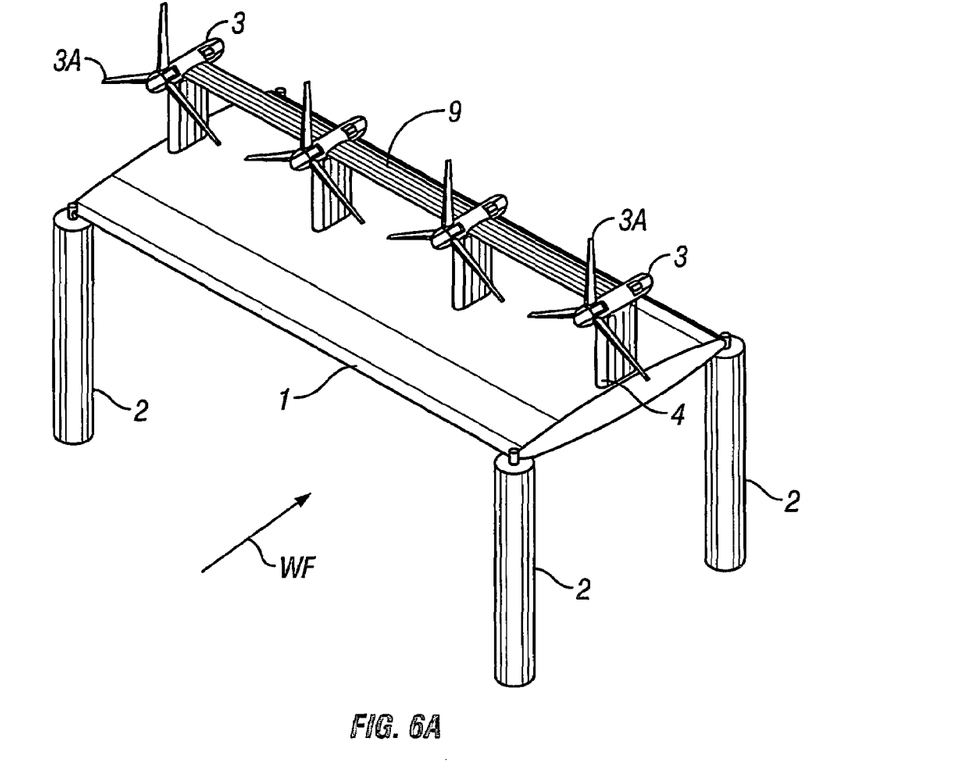
FIG. 6A is an schematic isometric schematic view of a further embodiment of a support structure for mounting turbines drivable by flowing water with a row of turbines carried thereby.
Figure 6B:
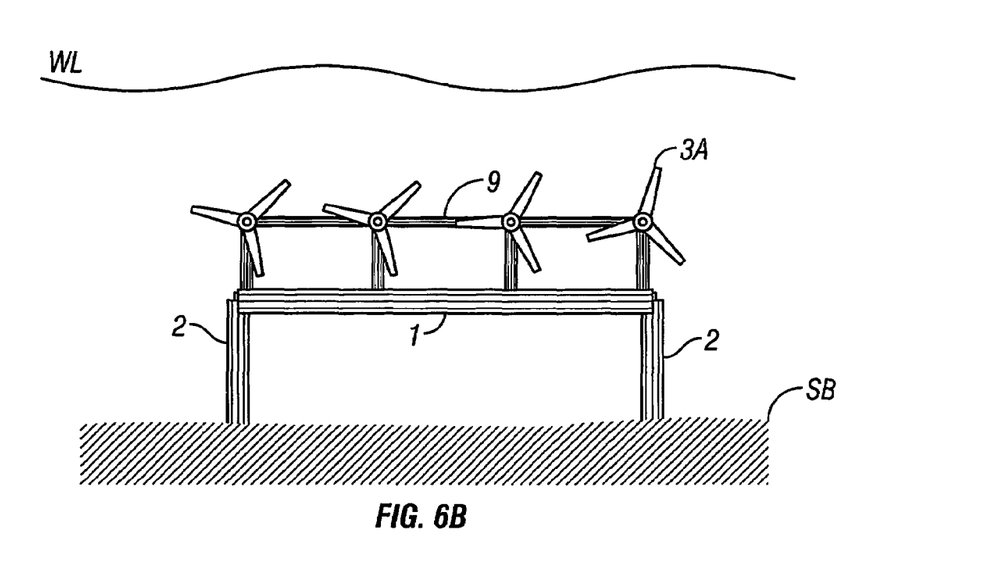
FIG. 6B is a front view of the embodiment of FIG. 6A when mounted from a sea bed.

Referring now to FIGS. 6A and 6B that are respectively an isometric view and an elevation viewed from the direction of flow WF of the water of an arrangement of the "biplane" type where a second wing-like platform or deck 9 is introduced between the turbines 3 at the level of the centre line of the rotors 3A of the turbines in order to improve the structural strength of the assembly. This arrangement should be compared with the "monoplane" arrangement of the isometric view in FIG. 1A where the individual turbine rotors are mounted on individual cantilevered support struts with no lateral bracing.

Figure 7A:
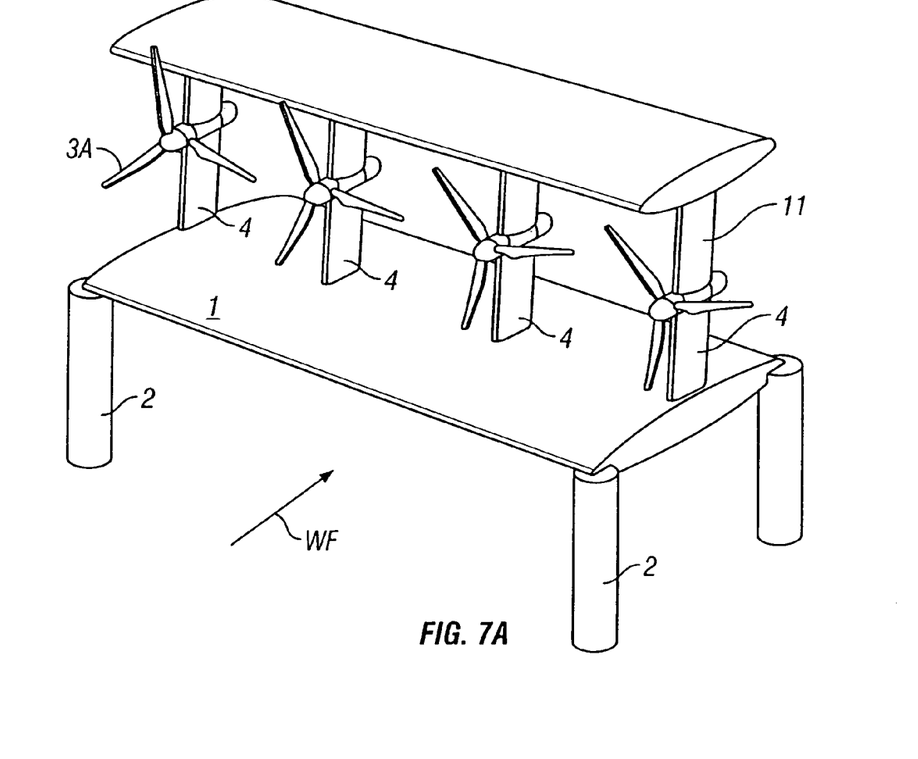
FIG. 7A is a schematic isometric schematic view of a further embodiment of a support structure for mounting turbines drivable by flowing water with a row of turbines carried thereby.

FIG. 7A illustrates an alternative "biplane" arrangement where a second streamlined planar platform 10 is installed immediately above the turbines on extensions 11 to their vertical support struts 4. As has been mentioned FIG. 7A is an isometric perspective while the FIGS. 7B and 7C respectively show an end/side elevation and a front elevation as viewed from the direction of flow WF of the current. This arrangement serves to increase the structural strength of the entire assembly and may permit it to span a greater distance between its supports 2 so as to accommodate either a greater number of turbines or larger sized turbines 3. Moreover, the effect of the upwardly facing convex surface of the lower supporting platform 1 and the downwardly facing convex surface of the upper platform 10 will be similar to that of a venturi (see the side elevation view of FIG. 7B) and will cause the flow through the rotors to be accelerated compared with the flow further upstream of the rotors. This will improve the energy captured per unit area of rotors, allowing smaller rotors to be used for a given power output than would otherwise be needed.

Figure 7B:
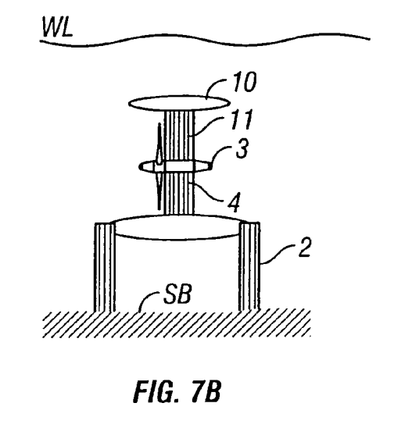
FIG. 7B is an end view of the embodiment of FIG. 7A when mounted from a sea bed.
Figure 7C:
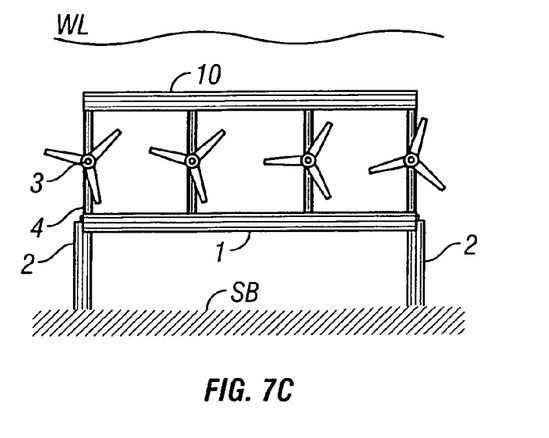
FIG. 7C is a front view of the embodiment of FIG. 7B.
Figure 8A:
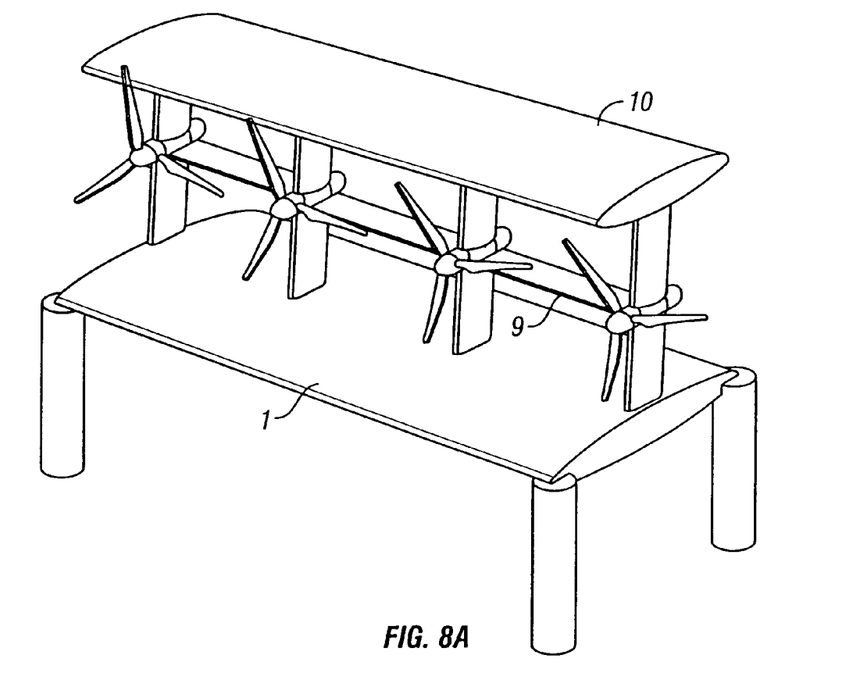
FIG. 8A is an isometric schematic view of an additional embodiment of a support structure for mounting turbines drivable by flowing water with a row of turbines carried thereby.
Figure 8B:
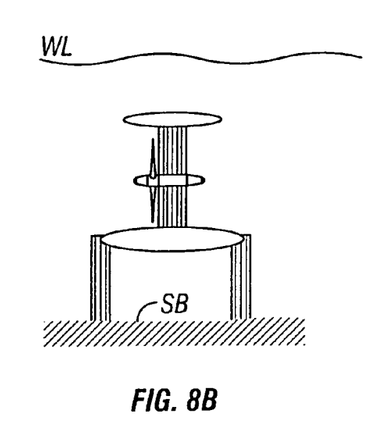
FIG. 8B is an end view of the embodiment of FIG. 8A when mounted from a sea bed.
Figure 8C:
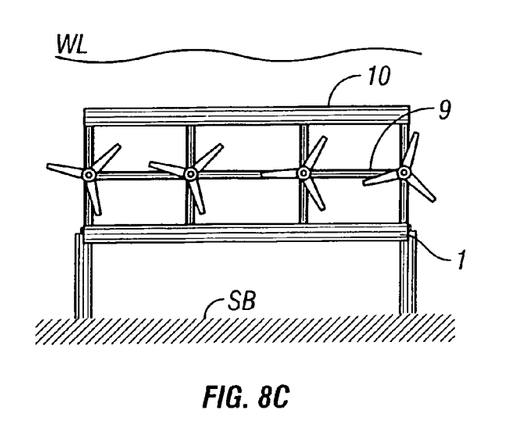
FIG. 8C is a front view of the embodiment of FIG. 5A.

The embodiment of FIGS. 8A, 8B and 8C can conveniently be regarded as an embodiment of a support structure combining the proposals of FIG. 6 and FIG. 7, and it is in effect a "triplane" arrangement with three wing-like platforms, a supporting platform 1, an intermediate platform 9 at the level of the turbine rotors 3A (as in FIGS. 6A, 6B and 6C) and an upper platform 10 (as in FIGS. 7A, 7B and 7C). The main advantage of this arrangement is greater structural strength, but at the cost of extra drag and greater wake interference with the rotors. However the aforementioned venturi effect will compensate for this.

In the structures of the FIGS. 7A, 7B, 7C and FIGS. 8A, 8B, 8C the upper platform 10 will generally (but not necessarily) be smaller in chord length and cross-section than the lower supporting platform 1 as the preferred embodiment, substantially as is shown in the various FIGS. 7A, 7B, 7C and FIGS. 8A, 8B and 8C.

It is also possible to add a further row of turbines above the upper wing in locations with adequate depth of water. In fact as many rows of turbines as can be accommodated by the depth of the water column in relation to their diameter is possible, even though the preferred embodiment in most situations will be a single row as this will be easier to access for maintenance, and involves the simplest structural arrangements. This multi-layer option is not illustrated.

The same lifting arrangements shown in the groups of FIGS. 2, 3, 4 and 5 may also be used for the "biplane" and "triplane" configurations shown in groups of FIGS. 6, 7 and 8.

Figure 9A:
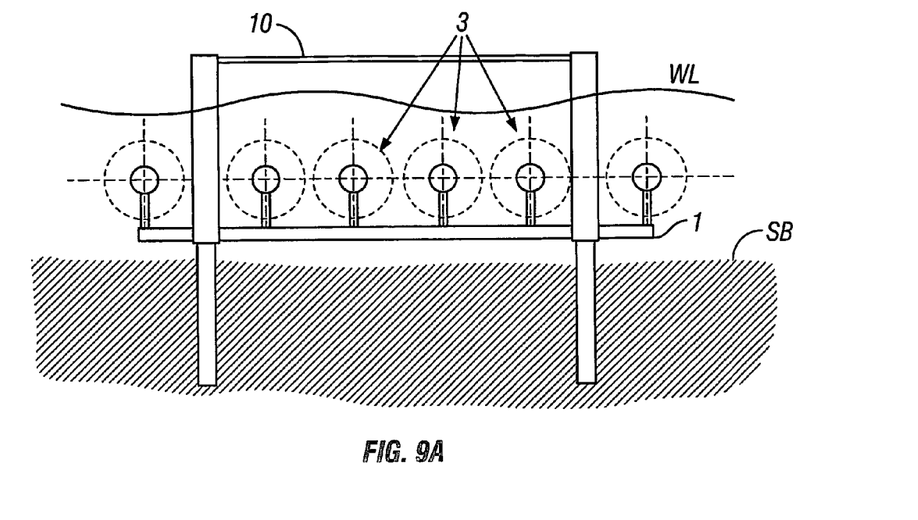
FIG. 9A schematically illustrates a further embodiment of a support structure for mounting turbines drivable by flowing water with a row of turbines carried thereby when the turbines are in an operational position below water level.
Figure 9B:
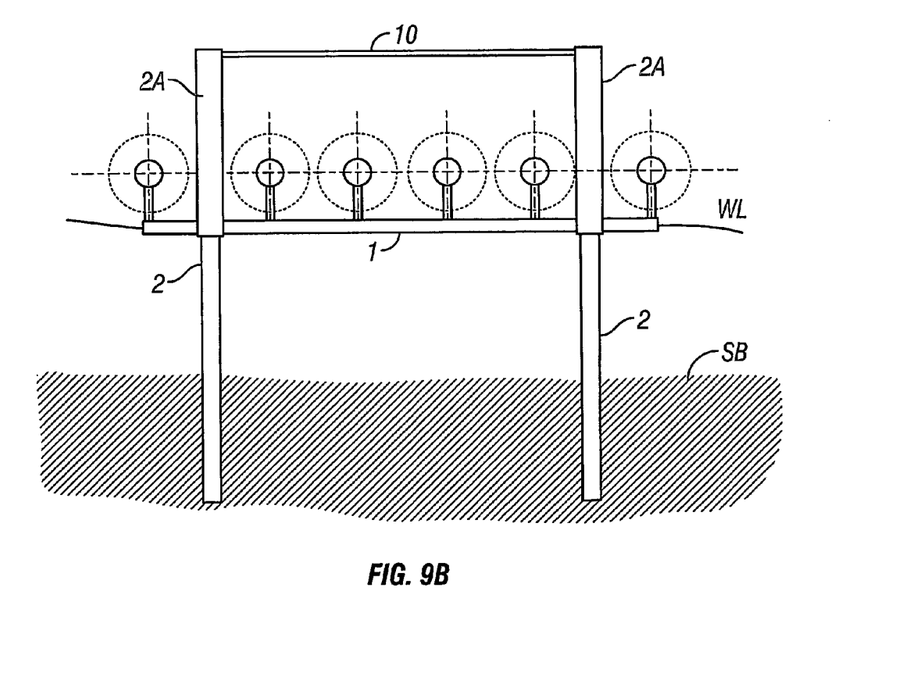
FIG. 9B schematically illustrates the embodiment of FIG. 9A when the turbines have been raised to an position above water level.

FIGS. 9A and 9B schematically illustrate an embodiment including a single planar surface or deck 1 carried by supports 2 involving lifting columns 2A the same principle might equally be applied to configurations with "biplane" or "triplane" arrangements such are shown as in the groups of FIGS. 6, 7 and 8.

FIG. 9A (in elevation when viewed from the direction WF of the current), schematically shows the support platform/deck system 1 lowered and operational, whilst FIG. 9B illustrates the platform/deck system raised to the surface for maintenance. These Figures indicates an arrangement in which a planar surface, platform or deck 1 can carry a plurality of turbines 3 and in this case it is supported in such a way that it does not necessarily rely on buoyancy to lift it, but mechanical means are provided through the use of hydraulic rams or electric jacks or winches (not shown) to lift the entire deck assembly complete with its array of turbines to the surface. Buoyancy of the platform 1 may be used to supplement the lift and thereby reduce the lifting forces needed. It will be understood that these FIGS. 9A and 9B clearly demonstrate the point that different methods may be used to lift the planar surface or deck which carries the turbines. It should also be noted that in the embodiment illustrated by FIGS. 9a and 9B, the lifting columns project above the water level at all times and are joined by a horizontal structural member, the latter being an optional addition.

Figure 10A:
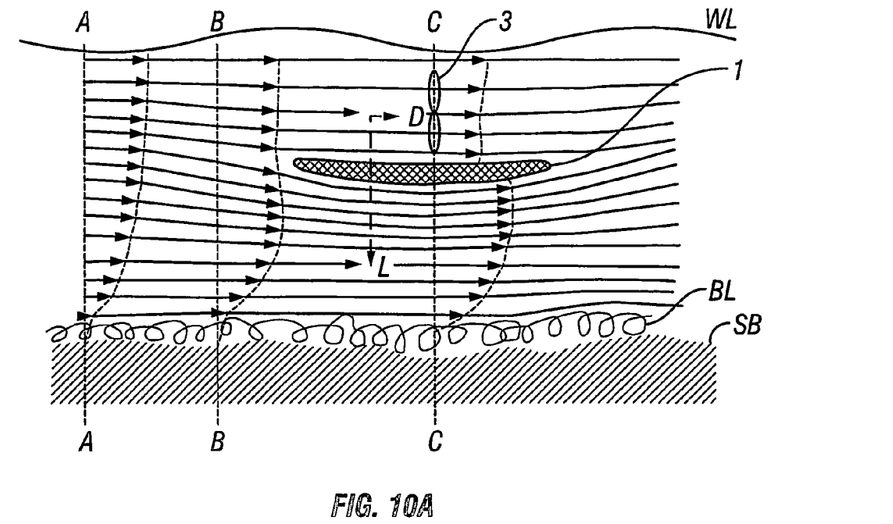
FIGS. 10A, 10B and 11 schematically illustrates water flows with respect to support structures incorporating the concepts of the invention.
Figure 10B:
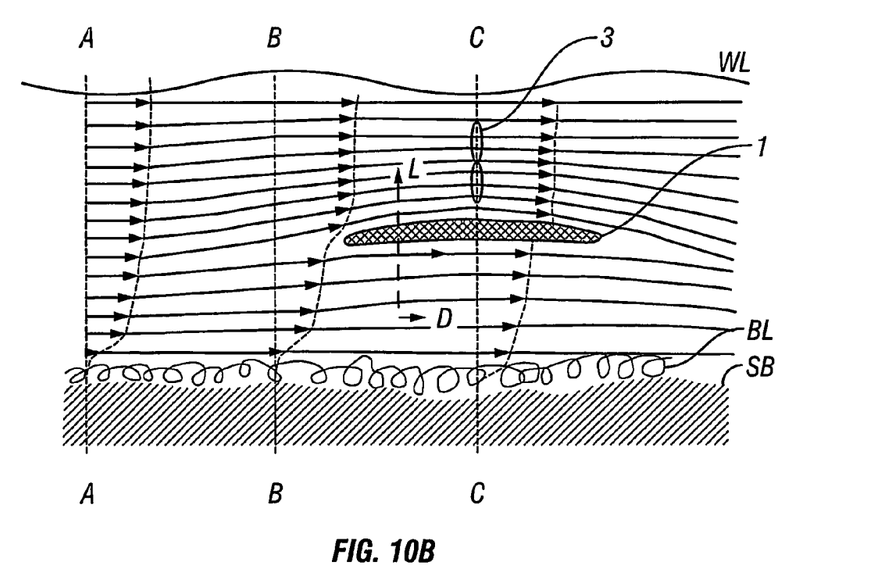

FIGS. 10A and 10B are cross-sectional schematic views through the main supporting platform or deck 1 of FIG. 1 or FIG. 6 (and as shown in all the other preceding figures). Although in the preceding figures the supporting platform or deck was shown as having a symmetrical, streamlined elliptical cross-section or profile, the example in FIG. 10A has an optional asymmetrical cross-section in which it is more convex on the lower side than on the upper side. The upper side may be slightly concave as in the illustration, but the same principle will apply if the upper side is either flat or less convex than the lower side. FIG. 10B shows an asymmetrical cross-sectioned platform or deck in which the upper side is more convex than the lower side.

FIG. 10A and FIG. 10B illustrate the flow of water above and below the platform and deck in the form of streamlines that would be followed by any particle in the flowing water column.

In both figures, at cross-section "A-A" upstream and to the left of the platform 1, the flow profile or velocity gradient through the water column is typical of the unimpeded current in a tidal stream, the sea, a river or an estuary, where the fastest flowing water is in the upper 50% of the flow and where generally an exponential degradation in velocity occurs in the lower 50% of the flow, reaching zero where the water is in direct contact with the bed (velocity being indicated in the figure by the length of the arrows where each streamline crosses the cross-section in question).

The velocity profile through the water column shown at profile "BB" illustrates how the water is already influenced by the presence of the obstruction caused by the shaped platform; water flow will start to deflect upstream of any obstruction.

Similarly the velocity profiles at "CC" show the approximate velocity distribution immediately above and below the platform or deck in the position where the turbines (3) are located. In effect, the profiles at "BB" are intermediate between those for "AA" and "CC".

The FIGS. 10A and 10B show the well known effect that is developed from the laws of continuity in fluid dynamics, that flow will accelerate if it needs to follow a longer path or if the cross section through which it flows smoothly decreases, and vice-versa. Hence the streamlines are squeezed together and the flow accelerates over the more convex side of an asymmetrical streamlined platform or deck and the flow decelerates and the streamlines tend to be spread wider apart on the less convex or the concave side. This is in fact similar to the flow past a wing or hydrofoil and the accompanying effect which is also well known is the fast moving fluid causes a reduction in pressure while the slower moving fluid causes a relative increase in pressure. The resulting pressure difference across the streamlined platform is similar to the effect of a hydrofoil or wing and generates a force at right angles to the direction of flow, which is effectively a Lift force, marked as "L" in FIGS. 10A and 10B. A drag force "D", much smaller than the lift force "L" will also be generated in the direction of flow. These forces need to be resisted by the supporting structure or the tensioned moorings.

FIGS. 10A and 10B both show that the effect of the asymmetrically shaped supporting platform or deck is to produce a relatively uniform flow over its upper surface, which will be slightly accelerated compared with the free stream situation (as shown at position "AA") in the case where the most convex side is uppermost (as in FIG. 10B) and slightly decelerated compared with the free-stream situation when the most convex side is downwards (as in FIG. 10A).

By placing the turbine rotors in the space above the asymmetrical supporting platform or deck (as shown schematically in Figures Loa and lob, it is possible to make the flow through the rotors more uniform (which is advantageous in terms of both efficiency and minimising wear and tear on the rotors). It is also possible to either increase or decrease the free stream velocity by a small but potentially useful amount, depending on whether the maximum convexity is faced upwards or downwards. This is also partly achieved by causing the turbulent boundary layer which occurs immediately above the bed of the flowing water current to be kept as low and out of the way of the turbine rotors as possible (FIGS. 10A and 10B). The boundary layer is caused by turbulence where the flow interacts with the sea or river bed, and in some cases if this is uneven or lacking in uniformity the boundary layer can be quite thick and could cause loss of performance and possible damage to the bottom of turbine rotors if they were to penetrate this area of highly disturbed flow.

Lastly the lift forces generated by the asymmetrical supporting platform or deck may be used to improve its stability; in the case of FIG. 10A the platform could be placed on compressive supports (or legs) and the downwardly directed force L will in effect provide extra down thrust to hold the platform securely onto the supports. In the case of FIG. 10B the supporting platform or deck might be buoyant and retained in position by tensioned moorings and the lift force acting upwards will tend to stabilise the platform by adding to buoyancy effects needed to maintain the tension in the moorings. Since both the lift and the drag forces will be proportionate to the square, of the velocity of the current they will tend to stabilise the system with significantly greater forces in stronger currents, and the lift and drag components will tend to stay proportionate.

FIG. 10C shows a modification of the embodiment given in FIG. 10B, where the space below the support platform or deck is almost completely blocked by an obstruction provided for this purpose and marked "XX". It can be seen that the effect of this is to force most of the flowing water column at point "AA" to rise and squeeze through a reduced height of water column at "CC" where the turbine rotors are deployed. The shape of the convex upper side of the platform is such that the flow over the top is uniform and accelerated. A small amount of water is optionally allowed to leak below the platform, as illustrated in FIG. 10B, through a slot or slots 12 above obstruction "XX" and immediately below the platform. This is primarily to prevent the turbulent boundary layer from interfering with the flow over the top; basically the small flow leaking underneath limits the height of the boundary layer by bleeding part of the main smoothly flowing stream below the platform.

Figure 11:
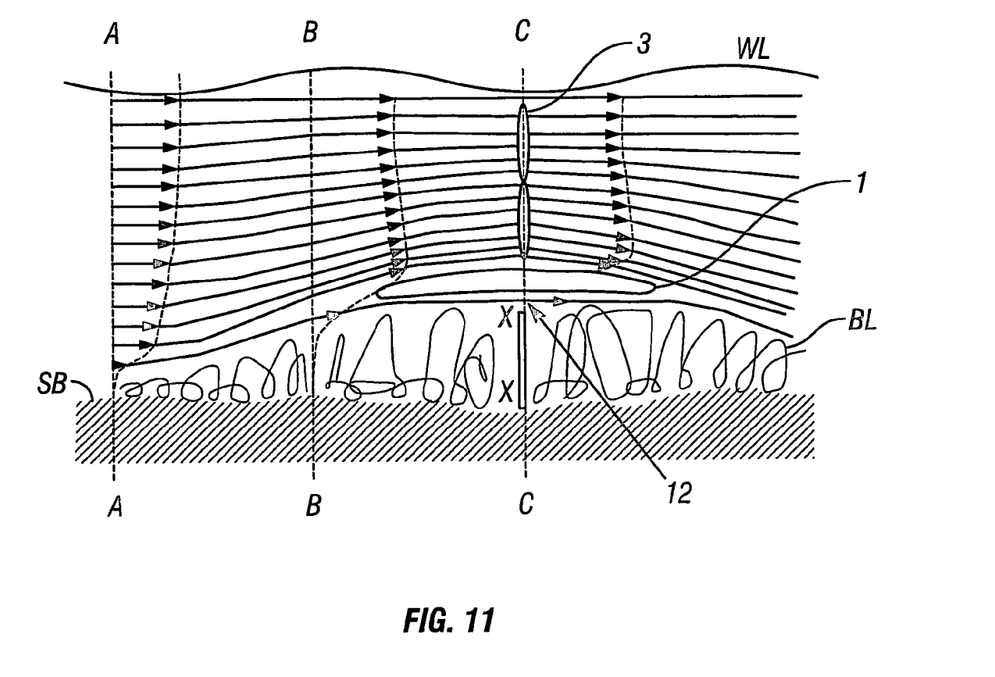

The advantage of the use of the embodiment in FIG. 11 is that not only does it result in more uniform and less turbulence in the flow through the turbines, but also there is significant acceleration of the flow which allows more power to be gained from smaller turbines.

The invention claimed is:

1. A support structure for supporting a flowing-water drivable turbine system at a selected position below a water surface and above a sub-aquatic bed, the support structure comprising a plurality of legs fixed to the sub-aquatic bed, a generally horizontal deck coupled to the plurality of legs, the deck having upper and lower surfaces, the deck having an asymmetrical streamlined cross-section defined by a greater convexity on one of the upper or lower surfaces compared with the other, and a second deck vertically spaced from, and arranged generally parallel to, the first deck.

2. The support structure of claim 1, wherein each of the upper and lower surfaces of the deck are generally rectangular.

3. The support structure of claim 1, further comprising displacing means for displacing the deck between an operational position below the water surface and a maintenance position adjacent to the water surface.

4. The support structure of claim 3, wherein the deck is buoyant and the displacing means comprises extendable tension members connecting the deck to the plurality of legs.

5. The support structure of claim 4, wherein the asymmetric streamlined cross-section of the deck is sufficient to provide by virtue of passing water flow an upward lifting force on the tension members.

6. The support structure of claim 3, wherein the displacing means comprises vertically movable lifting sleeves connecting the deck to the plurality of legs.

7. The support structure of claim 6, wherein the asymmetric streamlined cross-section of the deck is sufficient to provide by virtue of passing water flow a downward force on the plurality of legs.

8. A submerged water current turbine installation comprising a flowing-water drivable turbine system and a support structure for supporting the flowing-water drivable turbine system at a selected position below a water surface and above a sub-aquatic bed, the support structure including a plurality of legs fixed to the sub-aquatic bed, and a generally horizontal deck coupled to the plurality of legs, the deck having upper and lower surfaces, the deck having an asymmetrical streamlined cross-section defined by a greater convexity on one of the upper or lower surfaces compared with the other, the flowing-water drivable turbine system being fixed to one of the upper or lower surfaces, and a second deck vertically spaced from, and arranged generally parallel to, the first deck.

9. The submerged water current turbine installation of claim 8, wherein each of the upper and lower surfaces of the deck are generally rectangular.

10. The submerged water current turbine installation of claim 8, wherein the flowing-water drivable turbine system is fixed between the first and second decks.

11. The submerged water current turbine installation of claim 8, wherein the flowing-water drivable turbine system is fixed in horizontal alignment with the second deck.

12. The submerged water current turbine installation of claim 8, wherein the second deck is smaller than the first deck.

13. The submerged water current turbine installation of claim 8, further comprising displacing means for displacing the deck between an operational position wherein the water current turbine installation is below the water surface and a maintenance position wherein the water current turbine installation is above the water surface.

14. The submerged water current turbine installation of claim 13, wherein the deck is buoyant and the displacing means comprises extendable tension members connecting the deck to the plurality of legs.

15. The submerged water current turbine installation of claim 14, wherein the asymmetric streamlined cross-section of the deck is sufficient to provide by virtue of passing water flow an upward lifting force on the tension members.

16. The submerged water current turbine installation of claim 13, wherein the displacing means comprises vertically movable lifting sleeves connecting the deck to the plurality of legs.

17. The submerged water current turbine installation of claim 16, wherein the asymmetric streamlined cross-section of the deck is sufficient to provide by virtue of passing water flow a downward force on the plurality of legs.

18. The submerged water current turbine installation of claim 13, wherein the flowing-water drivable turbine system is situated on an upper surface of the deck, and an obstruction substantially blocks space below the deck when the deck is located on the operational position, the space below the deck remaining sufficient to permit any turbulent boundary layer forming adjacent to the sub-aquatic bed to pass below the deck.

* * * * *